United States Patent [19]

Lokhoff

[11] Patent Number: 5,267,098
[45] Date of Patent: Nov. 30, 1993

[54] DIGITAL RECORDING AND REPRODUCING SYSTEM

[75] Inventor: Gerardus C. P. Lokhoff, Eindhoven, Netherlands

[73] Assignee: U.S. Philips Corporation, New York, N.Y.

[21] Appl. No.: 669,136

[22] Filed: Mar. 13, 1991

[30] Foreign Application Priority Data

Mar. 20, 1990 [NL] Netherlands .......... 9000635

[51] Int. Cl.$^5$ .......... G11B 5/09
[52] U.S. Cl. .......... 360/50; 360/48; 360/51
[58] Field of Search .......... 360/50, 48, 53, 40, 360/32, 15, 39, 51; 375/19; 371/56

[56] References Cited

U.S. PATENT DOCUMENTS 4,620,311 10/1986 Schouhamer .......... 375/19
5,091,805 2/1992 Odaka et al. .......... 360/53
5,148,330 9/1992 Duurland et al. .......... 360/40

FOREIGN PATENT DOCUMENTS 357218 7/1990 European Pat. Off. .

OTHER PUBLICATIONS

"The art of digital audio", by J. Watkinson, Focal Press, 1988, Chapter 9, pp. 297-349.

Primary Examiner—Steven Mottola
Assistant Examiner—Ali Neyzari
Attorney, Agent, or Firm—Richard A. Weiss

[57] ABSTRACT

A digital recording and reproducing system, in which frames are recorded in a track on a record carrier. The frames alternate with interframe gaps. The interframe gaps as recorded in the track on the record carrier have a variable length.

31 Claims, 6 Drawing Sheets

DIGITAL RECORDING AND REPRODUCING SYSTEM

BACKGROUND OF THE INVENTION

The invention relates to a digital recording and reproducing system. The system comprises a device for recording a digital electric signal in a longitudinal track on a record carrier and a device for reproducing the digital electric signal from the track on the record carrier. The recording device has an input for receiving the digital electric signal with a specific sample rate and is adapted to convert the applied digital electric signal into a form in which it can be accommodated in consecutive frames at a specific bit rate, which frames can be recorded in the track on the record carrier. The reproducing device is adapted to read the frames from the track on the record carrier, to decode the information contained in the frames into a digital electric signal having substantially the same sample rate and to supply that digital electric signal to an output. The invention also relates to a recording device and a reproducing device for use in the digital recording and reproducing system, and to a record carrier obtained by means of the recording and reproducing system in accordance with the invention.

A recording and reproducing system of the type defined in the opening paragraph is known, for example, from the book "The art of digital audio" by J. Watkinson, Focal Press 1988, Chapter 9. Chapter 9.20 of this book describes, for example, a system known as SDAT. In that system a digital audio signal is recorded in a plurality of juxtaposed tracks formed, or to be formed, on a record carrier in the longitudinal direction of the record carrier. The recording device is intended for recording a digital signal, such as a digital audio signal originating from a digital signal source such as a Compact Disc audio player, on the record carrier. For this purpose, the digital signal having a specific sample rate fs, which is fs=44.1 kHz if the digital source is a CD player, is applied to the recording device. In the recording device, the digital electric signal is converted into a form in which it can be recorded on the record carrier. Recording in the track is effected at a bit rate which is neither equal to nor locked to the sample rate fs. For this purpose, the recording device comprises a separate frequency source (crystal). However, a problem may arise because the sample rate at which the digital electric signal is applied to the recording device varies. Moreover, the frequency supplied by the frequency source may vary. The last-mentioned frequency variations may be caused, for example, by temperature fluctuations affecting the frequency source.

The recording device also has an analog input. An analog electric signal applied via this input is sampled at a sample rate of 44.1 kHz and is digitized. In order to enable the analog signal to be sampled at 44.1 kHz, it is generally necessary to have a second frequency source (crystal) to supply the sampling frequency of 44.1 kHz. However, the frequency supplied by the second source may also vary. If the digital signal is to be recorded correctly on the record carrier, the variations in the sample rate and the clock frequency of the first-mentioned frequency source should be allowed and compensated for.

In the prior-art devices, this is realized, inter alia, by loading the samples of the digital signal, which are received with a variable sample rate, into a memory and by reading them out of this memory at a fixed frequency. Moreover, transport speed control is applied to compensate for the variable bit rate with which the signal processor in the recording device supplies the information in the frames for recording on the record carrier.

SUMMARY OF THE INVENTION

It is an object of the invention to propose a digital recording and reproducing system which in a different manner allows for the variations in the sample rate with which the digital signal is applied to the recording device and the bit rate with which the information converted in the signal processor is applied to the write head(s).

To this end, the recording and reproducing system in accordance with the invention is characterized in that the recording device is adapted to record frames alternately with interframe gaps in the track on the record carrier and the reproducing device is adapted to read the frames alternating with interframe gaps. The interframe gaps as recorded in the track on the record carrier have a variable length. The recording and reproducing system may be characterized further in that the frames as recorded in the track on the record carrier have a variable length.

The step underlying the invention is to refrain from correcting for variations at the recording side. This means that the frames are recorded on the record carrier alternately with an interframe gap having a specific nominal length. Variations in the sample rate and the bit rate lead to variations in the length of the interframe gaps. An increase (decrease) of the sample rate relative to a nominal value of the sample rate (i.e., the 44.1 kHz) results in a smaller (larger) interframe gap and in a smaller (greater) length for the frame and a subsequent interframe gap. Moreover, an increase (decrease) of the bit rate relative to a nominal value for the bit rate leads to a larger (smaller) interframe gap, the overall length of a frame and a subsequent interframe gap remaining the same.

The fact that no correction for bit rate variations is applied during recording obviously does not mean that the recording device does not require tape transport speed control. A control system ensuring tape transport with a fixed nominal tape speed is always needed. A correction for variations in the sample rate and the bit rate at the recording side is now possible at the reproduction side by the variations in the length of a frame and a subsequent interframe gap on the one hand and by the variations in the length of the interframe gap only on the other hand. At the reproduction side, the digital electric signal should, of course, be supplied with the sample rate of 44.1 kHz. For this purpose, the reproducing device comprises a frequency source supplying a frequency which is related to the sample rate of the digital electric signal appearing at the output of the reproducing device. This frequency source may also supply a clock frequency which varies as a result of, inter alia, temperature fluctuations to which the frequency source is subject.

This means that compensation for frequency variations must be applied at the reproduction side. A compensation unit required for this purpose can be used to compensate for the variations in the length of a frame and/or a (subsequent) interframe gap of the signal read from the record carrier.

The interframe gap may comprise channel bits which alternate with each bit cell. This means alternately "zeros" and "ones". As already stated, the interframe gap should have a nominal length to enable the length of this interframe gap to be increased or reduced. Obviously, this nominal length depends on the nominal value of the sample rate of the digital electric signal applied to the recording device, on the nominal value of the bit rate with which the signal is eventually recorded on the record carrier and on percent variations relative to these nominal values.

In the present example, the nominal length of the interframe gaps is selected to be 64 channel bits. In the case of a maximum permissible variation of ±0.2% of the sample rate, the length of the interframe gaps then varies between 32 and 96 channel bits. If after conversion and insertion in the frames, the digital signal is recorded in a plurality of longitudinally juxtaposed tracks on the record carrier, the frames will be recorded in the tracks in such a manner that the interframe gaps of adjacent tracks are situated at substantially the same positions, viewed in the longitudinal direction o the record carrier, and adjacent interframe gaps have the same length.

The recording device comprises an input for receiving the digital signal having a sample rate, conversion unit having an input coupled to the input of the device, which unit is adapted to convert the digital electric signal into a form enabling it to be accommodated in consecutive frames and to be supplied to an output thereof at a specific bit rate. The conversion unit is coupled to a write device for recording the frames in the track on the record carrier via its output, and a source for supplying a clock signal of a certain clock frequency via a clock signal input of the conversion unit, which clock frequency is in a fixed relationship to the bit rate at which the signal is recorded in the record carrier. The conversion unit is adapted to generate alternately frames and interframe gaps, which interframe gaps have a variable length related to the variations in the sample rate and the clock frequency.

The reproducing device comprises a reading device for reading information from a track on the record carrier, decoding unit for decoding the information accommodated in the frames into the digital electric signal having substantially the same sample rate, which decoding unit has an input coupled to an output of the reading unit and has an output for supplying the digital electric signal with a sample rate substantially equal to the sample rate during recording, and a source for supplying a clock signal of a specific clock frequency, which clock frequency is related to the sample rate of the digital electric signal supplied to the output. The device is characterized in that it comprises a compensation unit to compensate for the relative variations in the length of a frame and a succeeding interframe gap in the signal recorded on the record carrier and for the relative variation of the clock frequency. In this way, no correction is applied for variations in the sample rate and the bit rate on the recording side, while at the reproduction side, a correction is provided for variations in the length of the frames and their succeeding interframe gaps, variations in the interframe gap itself and variations of the various clock frequencies generated in the reproducing device.

The reproducing device may be characterized further in that the compensation unit comprise a synchronizing-signal detector, a phase comparator and tape-transport device. In such a case, an input of the synchronizing-signal detector is coupled to an output of the reading device, an output of the synchronizing-signal detector is coupled to a first input of the phase comparator, an output of the clock-frequency source is coupled to an input of the frequency converter, which has an output coupled to a second input of the phase comparator, an output of the phase comparator is coupled to a control input of the tape-transport device. The phase comparator is adapted to generate a control signal for the tape-transport device to control the transport speed of the record carrier in such a way that in the case of a deviation of the clock frequency relative to the nominal clock frequency in a positive or a negative sense the transport speed of the record carrier relative to a nominal transport speed is varied in a positive sense and a negative sense, respectively, and in that in the case of a deviation of the length of a frame and a succeeding interframe gap relative to a nominal length of the frame and a succeeding interframe gap in a positive or a negative sense the transport speed of the record carrier relative to the nominal transport speed is also varied in a positive sense and a negative sense, respectively.

BRIEF DESCRIPTION OF THE DRAWINGS

Embodiments of the invention will now be described in more detail, by way of example, with reference to the following Figures. In the Figures.

DESCRIPTION OF THE PREFERRED EMBODIMENTS

Figure 1:
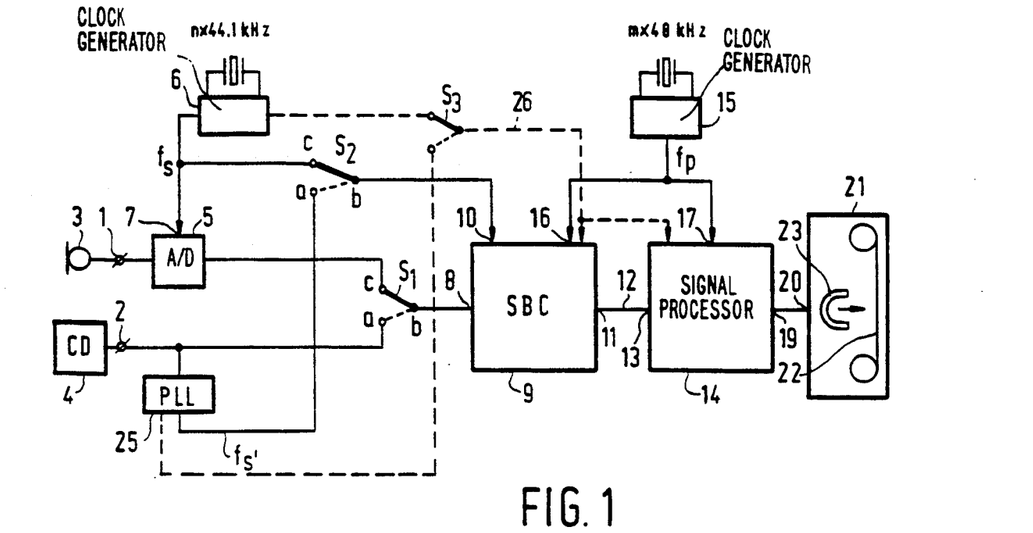
FIG. 1 shows an example of the recording device.

FIG. 1 shows diagrammatically an embodiment of the recording device in accordance with the invention. The device comprises an analog input 1 and a digital input 2. An analog audio signal, for example, generated by a microphone 3, can be applied to the device via the analog input 1. In an analog-to-digital converter 5, the analog audio signal is sampled at a sample rate fs equal to 44.1 kHz, after which the samples are digitized. For this purpose, clock pulses of a frequency equal to the sample rate fs are generated by a frequency source such as clock generator 6, which comprises a crystal operating at a frequency which is a multiple n of 44.1 kHz and which is applied to the clock signal input 7 of the A/D converter 5. In the present example n is 512. The crystal thus operates at a frequency of 22.579 MHz.

A selector switch S1, which is in position c-b, transfers the samples to an input 8 of a coding unit, for example, subband coding unit (SBC) 9. Subband coding units are described comprehensively in the literature, so that the subband coding unit will not be described in further detail. The samples from the A/D converter 5 are read into the subband coding unit 9 at a frequency corresponding to the sample rate fs. Therefore, the clock pulses from the clock generator 6 are applied to a clock pulse input 10 of the subband coding unit 9 via a selector switch S2, which is in position c-b.

If a digital audio signal is applied to the input 2, the selector switches S1 and S2 are both in position a-b. By means of a phase-locked loop (PLL) 25, the sample rate fs' is derived from the digital signal. The digital signal is read in at this sample rate fs' and is transferred to the subband coding unit 9.

Subband coded signals are applied to an output 11 of the subband coding unit and are transferred to an input 13 of a digital signal processing unit (or signal processor) 14 via line 12. The bit rate at which the subband signals are applied to the signal processor 14 via line 12 is, for example, 384 kbit/s. In order to realize this, clock pulses of a frequency fp of m×48 kHz are generated in a clock generator 15 and are applied to clock pulse inputs 16 and 17 of the subband coding unit 9 and the signal processor 14, respectively. A bit rate of 384 kbit/s cannot be derived simply from the clock generator 6, which has a crystal operating at 512×44.1 kHz. For this purpose, clock generator 15 is employed. Clock generator 15 has a crystal operating at m×48 kHz. In the present example m is also 512, so that the clock frequency of the crystal is 24.576 MHz. The bit rate of 384 kbit/s can be derived simply from frequency, namely via division by the number 64.

In the signal processor 14, the signal is converted, for example, in an 8—to—10 converter into a modified signal. An 8—to—10 converter is described, for example, in the Applicant's European Patent Application No. 150,082. In this converter, 8 bit data words are converted into 10-bit code words. Furthermore, the signal processor 14 can apply interleaving. All of this serves to enable an error correction to be applied to the received information at the receiving side. Error correction as applied in the system described herein is described in the Applicant's prior European Patent Application No. 90200128.8.

As a result of the processing, the information stream (and hence the bit rate) at the output 19 of the signal processor 14, i.e., the modified signal, is larger than the information stream (bit rate) of the signal at the input 13. The information obtained from output 19 of the signal processor 14 is accommodated in frames. Subsequently, an interframe gap is inserted between every two successive frames. The length of the interframe gap will appear to be variable; in the present example, the nominal value for the interframe gap In is taken to be 64 channel bits, which nominal value is subject to variations, as will become apparent hereinafter. The signal obtained by the signal processor 14 is supplied to the output 19. The signal processor 14 converts the signal applied to the input 13 in such a way that the bit rate at the output 19 is 768 kbit/s, i.e., twice the bit rate at the input 13.

Figure 8:
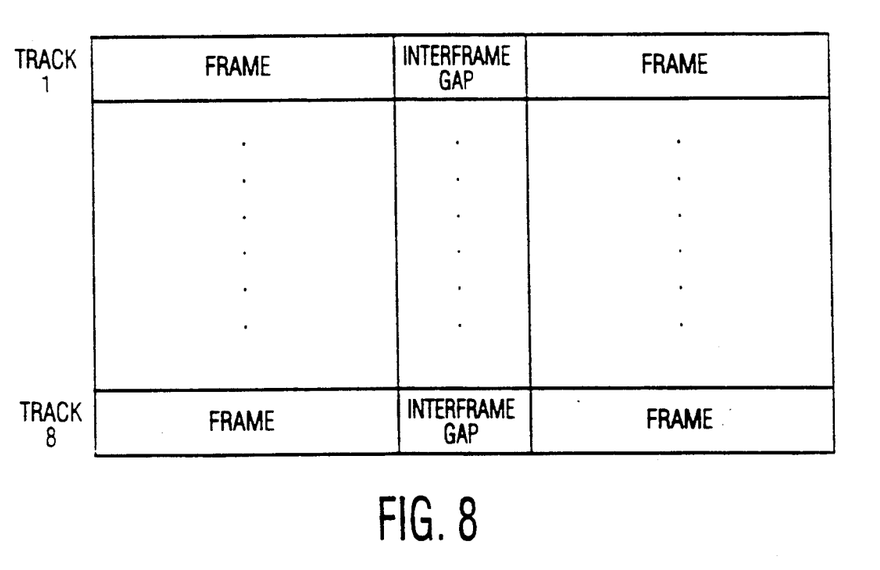
FIG. 8 shows eight longitudinally juxtaposed tracks of a record carrier used in the invention, the tracks having frames and alternating interframe gaps recorded thereon.

The output signal of the signal processor 14 is applied to an input 20 of a write device 21, by means of which the signal is recorded in a longitudinal track on the record carrier 22. The write device 21 may comprise one head or a plurality of heads, for example 8 juxtaposed heads, by means of which the information is recorded in 8 longitudinally juxtaposed tracks on the record carrier. See FIG. 8. In the last-mentioned case, a signal having a bit rate of 96 (=768/8) kbit/s is applied to each head.

A track contains frames having a fixed information content of 16320 bits, alternating with interframe gaps having a nominal length of 64 channel bits. This means that one frame and a successive interframe gap of nominal length situated in one track contain 16384 bits in total. This follows directly from the fact that in the present example the frame period is $170\frac{2}{3}$ ms. In the case of an in-track bit rate of 96 kbit/s, it follows that a frame including an interframe gap has a nominal length of 16384 bits.

The sample rates fs and fs' may vary. Similarly, the frequency fp may vary. As a result of this, there will be variations in the length of the interframe gap (having a nominal length of 64 channel bits) in the track, the length of the frame (which always contains 16320 channel bits) in the track, the bit rate at the output of the signal processor 14 (having a nominal value of 768 kbit/s), and the frame rate at the output of the signal processor 14 (having a nominal value of 375/64=96000/16384 frames/s).

When it is assumed that the maximum permissible variation of the sample rate fs is 0.2%, this means that the overall length of a frame and a successive interframe gap in a track may exhibit a maximum variation of 0.2% of 16384. This means a variation of 32 channel bits. Consequently, the interframe gap, which contains a nominal number of 64 channel bits, may have a length between 32 and 96 channel bits.

The operation of the device will now be described in more detail with reference to FIGS. 2a-2e.

Figure 2A:
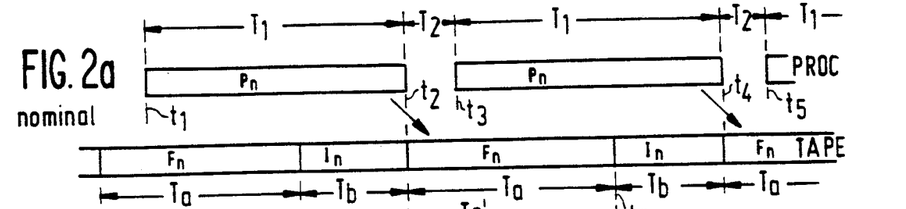
FIGS. 2a-2e illustrate the process of recording the information on the record carrier depending upon variations in the sample rate and the bit rate.

FIG. 2a illustrates a situation in which there are no variations in the sample rate fs, i.e., fs is equal to the nominal sample rate fsn, and in the clock frequency fp, i.e., fp is equal to the nominal clock frequency fpn. On the upper line in FIG. 2a, the nominal program cycles in the signal processor 14 are represented as a function of time. The nominal program cycles comprise nominal program blocks Pn and intervals T2. The lower line in FIG. 2a represents the nominal data stream as recorded in a track on the record carrier as a function of time, it being assumed hereinafter that eight of these tracks extend parallel adjacent one another on the record carrier. See FIG. 8. Each track comprises nominal frames Fn and interframe gaps In having lengths of Ta and Tb, respectively. Since the record carrier is moved at a constant speed this lower line also represents the physical position of the nominal data stream in the track on the record carrier.

The nominal program blocks Pn in the signal processor 14 have a length T1. Between two nominal program blocks, a nominal time interval T2 is interposed. In a program block Pn, the signal processor 14 prepares the data for recording: i.e., interleaving, Reed-Solomon coding, and 8-10 modulation.

In a program block Pn, the signal processor 14 processes the information contained in 2048 information packets (slots) of 32 bits each, which are supplied by the subband coding unit 9. As already stated, a double amount of information is produced at the output of the signal processor 14, i.e., 2048×32×2=131072 bits. These bits are divided among 8 tracks and are stored in these tracks. This means 16384 bits per track. However, the storage of the actual information requires only 16320 bits per track, as already stated above. This information is stored in one nominal frame Fn in the track. The signal processor 14 interposes nominal interframe gaps In between the nominal frames Fn, which nominal interframe gaps In have a nominal length of 64 (=16384.16320) channel bits. At a bit rate of 96 kbit/s, this means that the length of the nominal interframe gap In in time Tb is 0.66 ms. This means that the connection between the output 19 of the signal processor 14 and the input 20 of the write device 21 in fact comprises eight signal lines for the transfer of the 8 signals to be recorded in the eight tracks. The nominal frames Fn are recorded in the tracks in such a manner that adjacent nominal interframe gaps In in the eight tracks all have the same length, i.e., Tb. The same applies to the adjacent nominal frames Fn in the eight tracks, i.e., they have a length of Ta. See FIG. 8.

Figure 2B:
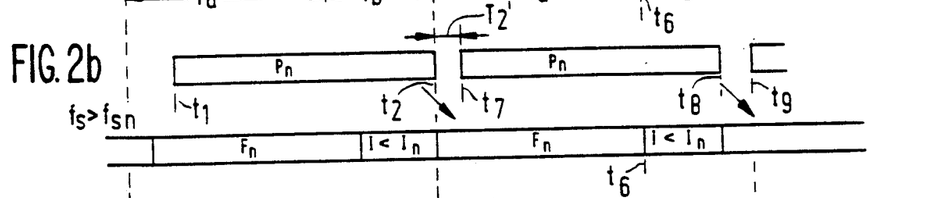

FIG. 2b illustrates a situation in which the sample rate fs deviates from the nominal value in such a manner that fs>fsn. This means that the crystal in the clock generator 6 of FIG. 1 operates at a frequency higher than $n \times 44.1$ kHz. All of the other parameters remain the same. Since fp has not changed, the processing time in the program block P remains the same (i.e., P=Pn) and is consequently equal to T1. Similarly, the bit rate at which the information is recorded in the track remains the same. This means that the length of the frames F, viewed in time, is equal to the nominal length Ta of the frames. Since fs>fsn the information stream applied to the input 8 of the subband coding unit 9 of FIG. 1 is larger. Nevertheless, the device processes this larger information stream. Eventually, this results in a larger information stream to be recorded in the track. This is achieved in that the program cycles succeed one another more rapidly. The intervals between the program blocks in FIG. 2b designated T2' are smaller than the nominal intervals T2 in FIG. 2a. Moreover, the frames F succeed one another more rapidly, i.e., the frame rate has increased. This is realized at the same bit rate by making the interframe gaps smaller (I<In). Thus, the signal processor 14 inserts interframe gaps of a length smaller than 64 channel bits in such a way that after processing the increased information stream on the input 8 of the subband coding unit 9 can be recorded in the track on the record carrier. This will be explained later in conjunction with reference to FIG. 3. However, it is to be noted here that variations in the crystal frequency $n \times 44.1$ kHz of the clock generator 6 affect the rate of information transfer between the subband coding unit 9 and the signal processor 14 and, in addition, affect the starting instants of the signal processing in the program blocks P in the signal processor 14. This effect is represented diagrammatically by means of the broken line 26 in FIG. 1 and will be explained in conjunction with reference to FIG. 3. The variations of fs and fs' are applied to the clock generator 6 and the signal processor 14 via the switch S3, which should be in the appropriate position, and the line 26.

Figure 2C:
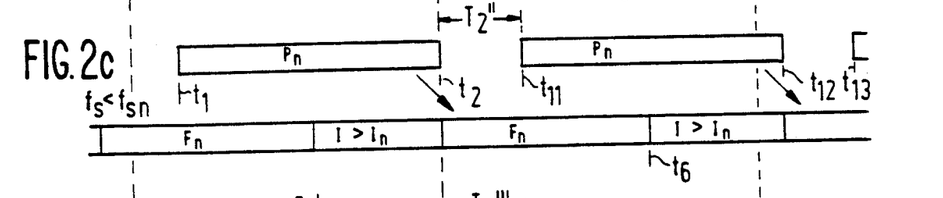

FIG. 2c illustrates the situation in which the sample rate fs is smaller than fsn, the other parameters again being the same. Since fp is again equal to fpn, the program blocks P again have a length of T1 and the bit rate at which the information is recorded in the track is unchanged. This means that the length of the frames F is equal to the nominal length Ta.

Since fs<fsn, a smaller information stream is applied to the input 8 of the subband coding unit 9 of FIG. 1. This means that a smaller information stream is to be recorded in the track. The program cycles now succeed one another less rapidly. The intervals between the program blocks of P are then larger, i.e., T2''>T2. Moreover, the frame rate is reduced. This is achieved at the same bit rate by inserting longer interframe gaps (I>In) between the frames. Thus, the signal processor 14 inserts interframe gaps of such a length that, after processing, the information stream at the input 8 of the subband coding unit 9 can be recorded in the track. Consequently, the interframe gaps become longer than 64 channel bits.

Figure 2D:
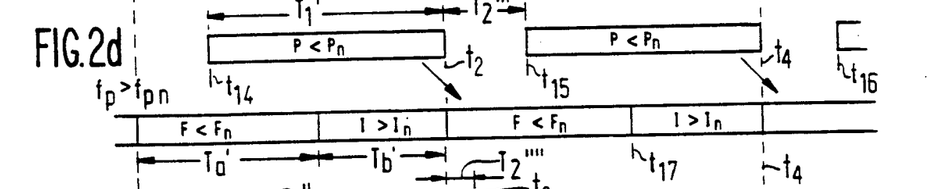

FIG. 2d illustrates a situation in which the clock frequency fp is higher than the nominal clock frequency fpn, and the sample rate fs is equal to fsn. The processor 14 now operates at a higher clock frequency. The program blocks P are now shorter than T1. Moreover, the bit rate at which the information is recorded in the track increases.

Since the information stream applied to the input 8 of the subband coding unit 9 corresponds to the nominal information stream (fs is equal to fsn) the frame rate remains equal to the nominal frame rate of 375/64 frames/s. Moreover, the overall cycle time in the signal processor 14, i.e., T1'+T2''' remains equal to the nominal cycle time, i.e., T1+T2.

In the case of a higher bit rate of the information stream on the record carrier an equal frame rate means that the physical length of the frames in the track becomes smaller (F<Fn) and that the length of the interframe gaps increases (I>In) in such a way that Ta'+Tb'=Ta+Tb. The interframe gaps now contain more than 64 channel bits.

Figure 2E:
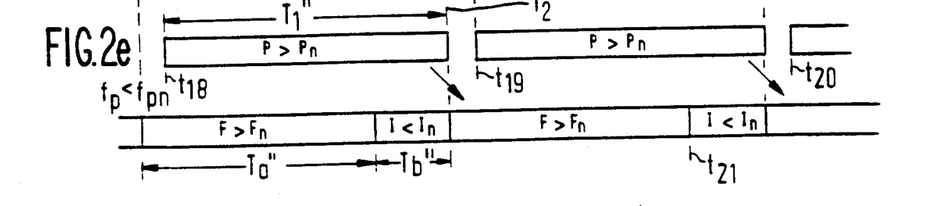

FIG. 2e illustrates the situation in which the clock frequency fp is smaller than the nominal clock frequency fpn. In this case the sample rate fs is equal to fsn. The processor 14 now Operates at a lower clock frequency. The program blocks P are now longer than T1. Moreover, the bit rate at which the information is recorded in the track decreases.

In the same way as in the situation illustrated in FIG. 2d the frame rate now also remains equal to 375/64 frames/s. The total program cycle time, T1''+T2'''', is again equal to the nominal cycle time T1+T2. This means that the intervals are smaller, T2''''<T2.

In the case of a lower bit rate of the information stream on the record carrier the equal frame rate results in an increased physical length of the frames in the track F>Fn, and a reduced length of the interframe gaps (I<In), in such a way, that Ta''+Tb''=Ta+Tb. From the above, it also follows that the length of the interframe gap as recorded in a track on the record carrier is related to the ratio between fs and fp. If fs and fp both increase or decrease, while their ratio remains the same, the length of the interframe gap will not change. This can be demonstrated in qualitative terms by comparison between FIG. 2b and FIG. 2d.

The operation of the device shown in FIG. 1, for obtaining the output signals as illustrated in FIG. 2, will now be explained with reference to FIG. 3.

Figure 3:
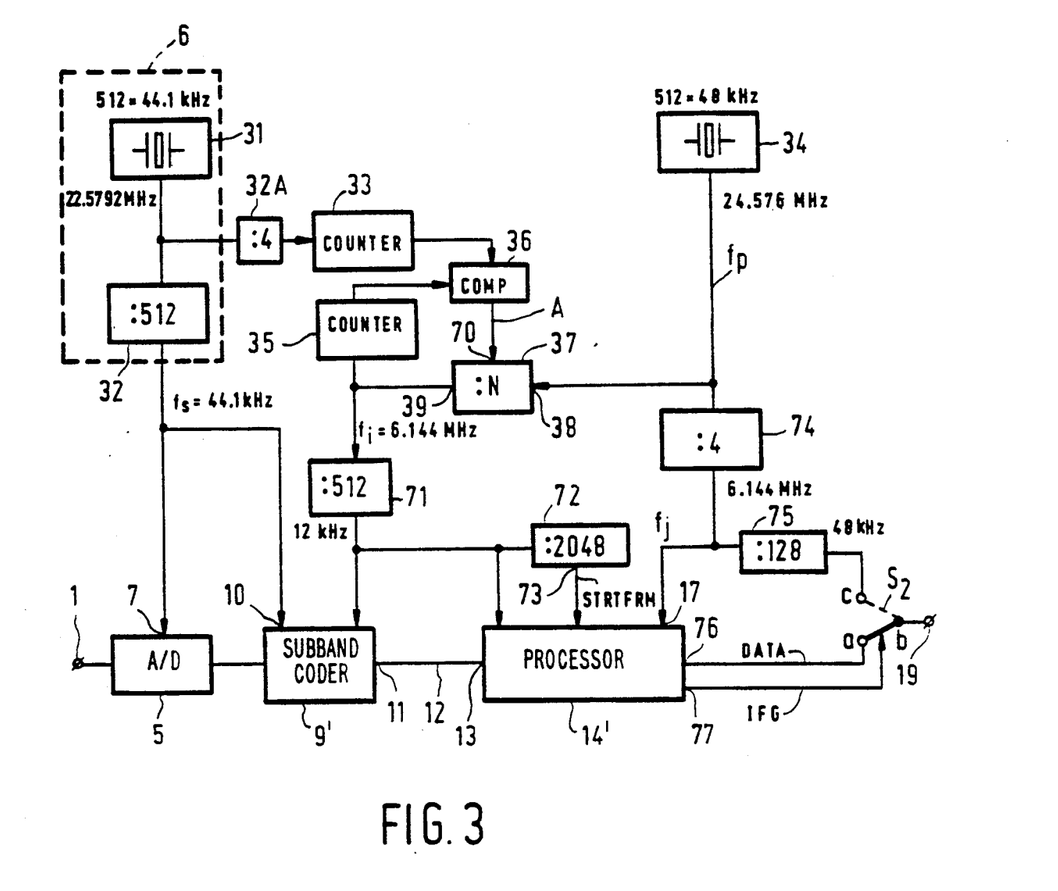
FIG. 3 shows the device of FIG. 1 in more detail.

FIG. 3 shows the clock generator 6, which comprises a crystal 31 operating at a frequency of $512 \times 44.1$ kHz, i.e., 22.5792 MHz. In a divider 32, which forms part of the clock generator 6, this frequency is divided by 512, yielding a frequency fs which is 44.1 kHz in the nominal situation. It is obvious that in the case of a frequency source such as PLL 25 of FIG. 1, this source should comprise a PLL operating at a (nominal) frequency of $512 \times 44.1$ kHz For simplicity, however, the circuit shown in FIG. 1, including the switch S1, is not shown in FIG. 3. The 22.5792 MHz clock frequency is applied to a counter 33 via a frequency divider 32A, which divides the frequency of the crystal 31 by four.

The clock generator 15 in FIG. 1, as shown in FIG. 3, comprises a crystal 34 operating at a frequency of 512×48 kHz, i.e., 24.576 MHz. This clock frequency is applied to a counter 35 via a frequency divider 37, which divides the frequency of the crystal 34 by N. In the nominal case N is 4, as will become apparent hereinafter.

In a comparator 36 the counts of the two counters 33 and 35 are compared with each other in the following manner. The counters 33 and 35 are both 10-bit counters. Counter 33 counts cyclically from 0 to 881 inclusive and the counter 35 counts cyclically from 0 to 959 inclusive. Both counters are started at the same instant and have a start value of zero. When the counter 35 reaches the count "0" (decimal) the count of the counter 33 is used for determining N in the divider 37. If this count is substantially "0" (decimal) N in the divider 37 is set to 4. If the count of the counter 33 has not reached the value "0" at that time, N will be taken equal to 6. If the count of the counter 33 is larger than "0", this results in N=3. After this, the cycle is restarted, the value for N obtained in a preceding cycle being stored in the divider 37, and the counter 33 is not reset to zero but continues counting starting from the value reached previously. In this way a phase-locked loop has been realized in which $f_i$ is locked in phase to $f_s$. In this way the comparator 36 each time compares the count of the counter 33 with the value 882 and supplies a signal A to define the value N in a manner as described above.

When both crystals 31 and 34 operate at their nominal values N will be 4. A frequency f equal to 6.144 MHz then appears on the output 39.

A variation of the clock frequency of the crystal 31 in a positive sense (i.e., the crystal supplies a clock frequency higher than 22.5792 MHz) means a higher count of the counter 33 and hence another value of the control parameter A, i.e., such as to decrement the value of N in the divider 37. The clock frequency $f_i$ supplied by the divider 37 is then higher than 6.144 MHz. A variation of the clock frequency of the crystal 31 in a negative sense then means that the clock frequency supplied by the divider 37 is lower than 6.144 MHz. On an average, a variation in the clock frequency of the crystal 34 will not result in a long-term variation in the clock frequency fi of the divider 37. Nevertheless, the clock frequency at the input 38 increases. For the generation of the control parameter A, an increase of the clock frequency of the crystal 34 (while the frequency of the crystal 31 remains the same) has the same effect as in the case in which the clock frequency of the crystal 31 decreases (while the frequency of the crystal 34 remains the same). This means that the value N in the divider increases. Over a longer period these two effects substantially cancel one another. Therefore, it may be considered to derive fi only from the clock frequency of the crystal 31. However, preferably this is not done because deriving fi directly from the clock frequency of the crystal 31, without allowing for the clock frequency of the crystal 34, requires the use of inconvenient and difficult to realize dividing factors.

The nominal value of 6.144 MHz for fi can be derived simply from the clock frequency of the crystal 34, namely by a division by four. Moreover, variations in the clock frequency of the crystal 34, as explained hereinbefore, do not affect fi. In addition, the variations in the clock frequency of the crystal 31 result in variations of fi, as is desired.

The clock signal from the divider 37 is applied to a divider 71, which divides the clock frequency by 512 so that a clock signal of a nominal frequency of 12 kHz appears on the output. This 12 kHz frequency is applied to subband coder 9, and to processor 14'. This frequency defines the data transfer between the subband coder 9' and the processor 14' and the data rate at which this transfer takes place. This is because this 12 kHz frequency dictates the frequency at which the information packets of 32 bits length are transferred to the processor 14' by the subband coder 9' via the connection 12. This results in a data transfer rate of 384 kbit/sec. For a further explanation of the format of the signal applied to line 12 by the subband coder 9' reference is made to the prior Netherlands Patent Applications 89 01 401 and 90 00 338. This 12 kHz frequency is also applied to a divider 72, which divides the clock frequency by 2048. This yields a nominal clock frequency of 375/64 at the input 73. This clock frequency dictates and is equal to the frame rate, and it is applied to the processor 14'.

The 24.576 MHz clock frequency from the crystal 34 is also applied to the processor 14' via a divider 74, which divides the clock frequency by four.

The processor in FIG. 3 bears the reference numeral 14' to indicate that it represents that section of the signal processor 14 which performs the signal processing upon the information stream. Consequently, the signal processor 14 in FIG. 1 comprises the processor 14' and some peripheral parts, such as some of the counters and frequency dividers shown in FIG. 3. In fact, the same applies with respect to the subband coding unit 9 of FIG. 1, a portion of which bears the reference numeral 9' in FIG. 3.

The clock frequency of nominally 6.144 MHz from the divider 74 is also applied to a divider 75, which divides the clock frequency again by 128, so that a clock frequency of 48 kHz is generated on the output. The output of this divider 75 is coupled to the c terminal of a switch S2. The output 76 of the processor 14' is coupled to the a-terminal of the switch S2. The processor 14' further has an output 77 on which a control signal is produced which is applied to the control signal input of the switch S2. The b-terminal of the switch S2 is coupled to the output 19.

Figure 9:
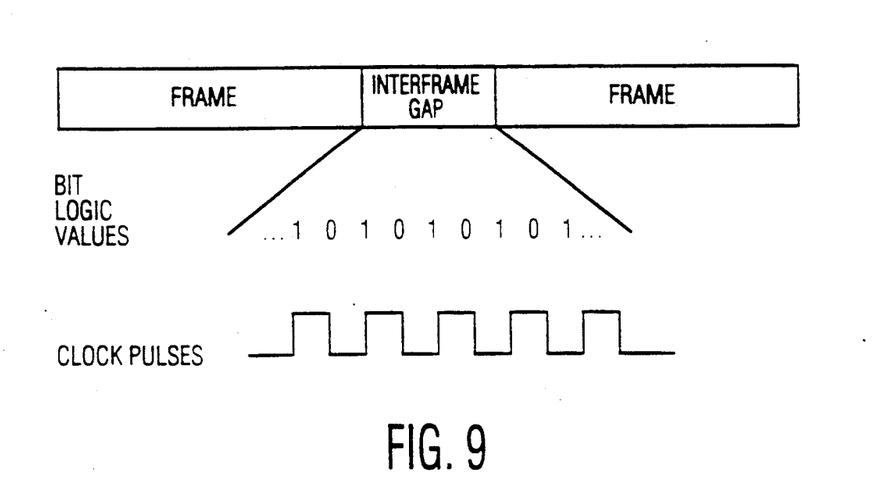
FIG. 9 shows the alternating bit logic values created from clock pulses to form the interframe gap.

The device operates as follows. Again, it is assumed that all the parameters have their nominal values as illustrated in FIG. 2a. The data is read in at 44.1 kHz, is processed in the subband coder 9' and is loaded into the processor 14' at a bit rate of 384 kbit/s. This is effected under control of the 12 kHz clock frequency from the divider 71. The clock frequency from the divider 72 dictates the starting instants t1, t3, t5, see FIG. 2a, of the program blocks Pn, in which the information applied to the signal processor 14 is processed. The frequency fj from the frequency divider 74 dictates the operating speed in the processor 14' and thus determines the length (t1, t2) of a program block Pn. In a program block Pn, a fixed amount of information is processed in conformity with a fixed algorithm, so that the frequency fj from the divider 74 dictates the length of the program block Pn. As soon as a fixed amount of information has been processed, i.e., at the instant t2, which is ascertained internally in the processor 14', the processed information is output via the output 76. The processor 14' again ascertains internally when all the information has been supplied to its output. This is at the instant t6, see FIG. 2a, the lower line. In the time interval t2, t6 the switch S2 is position a-b, so that the information from the processor 14' can be applied to the output 19. At the instant t6, the processor 14' generates an IFG control signal on the output 77, under the influence of which signal the switch is set to position c-b, see FIG. 1. This IFG control signal remains available on the output 77 until the processor 14' has internally ascertained the termination of the next program block Pn at the instant t4, so that the IFG control signal disappears again. In the time interval t6, t4, in which the switch S2 is consequently in position c-b, clock pulses having a frequency of 48 kHz and supplied by the divider 75 are applied to the output and, as such, creates the interframe gap. In the nominal situation, there are 32 clock pulses which effectively create alternating bit logic values in the interframe gap. See FIG. 9. Consequently, the time interval t6, t4 has a nominal length of 0.66 ms. At the instant t4, another program block is carried out. The amount of information processed in this program block, during the time interval t3, t4, is applied to the output 76 and is transferred to the recording device 21 via the switch S2, which is again in position a-b. In the recording device, the information is recorded on the record carrier in the time interval Ta following t4.

FIG. 2b illustrates the situation in which fs is higher than 44.1 kHz. This is because the frequency of the crystal 31 is higher than 22.5792 MHz. This means that the information appears on the input 8 of the subband coder 9' at a higher sampling frequency and is consequently processed at a higher clock frequency, i.e., with a higher speed, in this subband coder 9'. The frequency at the output of the divider 71 is now higher than 12 kHz. This also means that the data transfer rate to the processor 14' is now higher than 384 kbit/s. The frequency generated by the divider 72 is also higher. This means that the program blocks P succeed one another more rapidly. This can be seen in FIG. 2b in that the time interval t1, t7 is smaller than the time interval t1, t3 of FIG. 2a. Since the frequency fj, which is applied to the input 17 of the processor 14' and which dictates the speed of the signal processing in the processor 14' has not changed, the processing time in the processor 14' has not changed. Viewed in time, the length of the program blocks has remained the same as in the situation illustrated in FIG. 2a. The processor 14' again internally detects the instants t2, t8 at which the fixed amount of information has been processed, so that it can be applied to the output. The switch S2 is in position a-b, so that the information can be transferred to the output 19. The processor 14' further detects the instant t6 at which the information is applied to the output 76. At this instant, the IFG control signal is applied internally to the output 77, so that the switch S2 is set to position c-b and the 48 kHz clock pulses from the divider 75 can be applied to the output 19 to produce the interframe gap. At the instant t8, the processor 14' detects the end of the next program block. At this instant the IFG control signal is terminated, so that the switch S2 is reset to position a-b. The information processed in the next program block can then be applied to the output 19. The recording time t2, t6 for the information in the record carrier is equal to the recording time in FIG. 2a. Since the total time of a program cycle t2, t8 is smaller than in FIG. 2a, the interframe gap is consequently shorter.

The description of the operation of the circuit in the situation illustrated in FIG. 2c can now be given briefly. If fs is smaller than 44.1 kHz, the speed of information processing in the subband coder 9' and the speed of data transfer to the processor 14' is lower. Moreover, the frequency supplied to the processor 14' by the divider 72 is lower. The clock pulses from divider 72 dictate the beginnings of the program blocks at the instants t1, t11, t13, see FIG. 2c. The time interval t1, t11 is now longer than the time interval t1, t3 of FIG. 2a. However, the signal processing in the processor 14' has not changed. This means that the switch S2 is in position a-b during the time interval t2, t6 and in position c-b in the time interval t6, t12.

FIG. 2d now illustrates the situation in which the clock frequency fp from the crystal 34 is higher than 24.576 MHz. As stated hereinbefore, these variations do not affect the clock frequencies supplied by the dividers 71 and 72. However, the clock frequency supplied by the frequency divider 74 changes. This clock frequency increases. This means that the speed of signal processing in the processor 14' has increased. The length of the program blocks P has consequently become shorter. In FIG. 2d this is visible in that the time intervals t14, t2 and t15, t4 are shorter than the time intervals t1, t2 of FIG. 2a. The pulses from the frequency divider 72 again dictate the beginnings of the program blocks at the instants t14, t15, t16. The time intervals t14, t15 and t15, t16 are equal to the time interval t1, t3. This is because the crystal 31 again has its nominal frequency value and the variation in the resonant frequency of the crystal 34 has no effect.

At the instant t2, the operation in program block P has ceased and the information can be applied to the output 76 of the processor 14'. Since fp is now larger than the nominal value fpn the information is supplied more rapidly to the output 76. This means that the information processed in a program block is recorded more rapidly and hence in a shorter time interval t2, t17, on the record carrier. In FIG. 2d this is visible in that the time interval t2, t17 is shorter than the time interval t2, t6 of FIG. 2a.

At the instant t17, the processor 14' again produces the IFG control signal on the output 77, causing the switch S2 to change over to position c-b. At this instant, the clock pulses from the frequency divider 75, which form the interframe gap, are recorded on the record carrier. Since the frequency of the crystal 34 is higher than the nominal value of 24.576 MHz, the frequency of the clock pulses supplied by the divider 75 will be higher than 48 kHz. The bit rate of the data supplied to the output 76 by the processor 14' and recorded on the record carrier is now higher than the nominal bit rate of 96 kbit/s per track.

FIG. 2e illustrates the situation in which the clock frequency fp of the crystal 34 is lower than 24.576 MHz. Again this variation has no effect on the clock frequencies supplied by the frequency dividers 71 and 72. However, the clock frequencies supplied by the frequency dividers 74 and 75 change, i.e., they decrease. This means that the speed of signal processing in the processor 14' is lower. Consequently, the length of the program blocks P is greater than the nominal length. In FIG. 2e this is visible in that the time intervals t18, t2 and t19, t4 are longer than the time interval t1, t2 of FIG. 2a. The pulses from the frequency divider 72 again dictate the instants t18, t19, t20 at which the program blocks P begin. The time intervals t18, t19 and t19, t20 are equal to the time interval t1, t3.

At the instant t2, processing in the program block P is completed and the information can be supplied to the output 76 of the processor 14'. Since fp is now smaller than the nominal value fpn the information is supplied more slowly to the output 76. This means that the information processed in a program block is recorded more slowly, i.e., in a longer time interval t2, t21, on the record carrier. In FIG. 2e this is visible in that the time interval t2, t21 is shorter than the time interval t2, t6 in FIG. 2a. At the instant t21, the processor 14' again produces the IFG control signal on the output 77, so that the switch S2 is set to position c-b.

Since the frequency of the crystal 34 is lower than the nominal value of 24.576 MHz, the frequency of the clock pulses supplied by the frequency divider 75 becomes smaller than 48 kHz. Moreover, the bit rate of the data transferred to the output 76 by the processor 14' and recorded on the record carrier is lower than the nominal bit rate of 96 kbit/s in a track.

Figure 4:
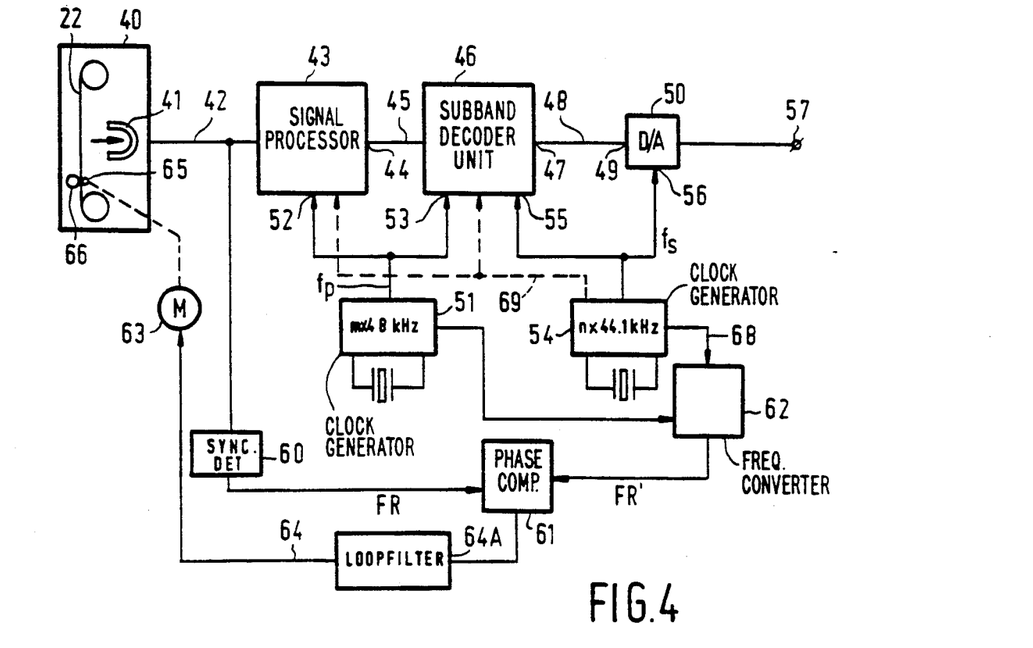
FIG. 4 shows an example of a reproducing device.

FIG. 4 shows diagrammatically an embodiment of the reproducing device in accordance with the invention. The device comprises a reading device 40, comprising at least one read head 41, for reading the information recorded by the write device 21 of FIG. 1 from a track on a record carrier 22. If the record carrier 22 again comprises a plurality of tracks which are juxtaposed in the longitudinal direction on this record carrier, for example, 8 tracks, the reading device will comprise 8 read heads 41. The serial data stream read from the track (tracks) is applied to a signal processing unit (or signal processor) 43 via the line 42. In this signal processor 43 the information contained in the frames is processed inversely to the manner in which the information has been processed in the signal processor 14 shown in FIG. 1. This means that deinterleaving and an error correction can be applied, and that the 10-bit channel words are recoverted into 8-bit information words in a 10-8 converter. This yields the subband signals, which are applied from the output 44 to a decoder unit 46, in the present case subband decoder unit 46, via the line 45. In this subband decoder unit 46, the subband signals are recombined to form a wide-band digital signal. This wide-band digital signal is applied to the output 47 and, via the line 48, to the input 49 of the digital-to-analog converter 50. The device comprises a first frequency source such as clock generator 51, which supplies a (nominal) clock frequency fp to a clock signal input 52 of the signal processor 43 and to a clock signal input 53 of the subband decoder unit 46. In this case, fp is equal to m×48 kHz or 24.576 MHz. The clock frequency at which the program in the signal processor 43 runs is derived from fp. In addition, the (nominal) bit rate of 384 kb/s with which the information is applied to the subband decoder unit 46 via the line 45 is also derived from this frequency fp.

The reproducing device further comprises a second frequency source such as clock generator 54, which generates a nominal sampling frequency fs and supplies it to a clock signal input 55 of the subband decoder unit 46 and to a clock signal input 56 of the D/A converter 50. This frequency fs is 44.1 kHz and is the frequency with which the samples are applied to the D/A converter. For this purpose, the frequency divider 54 comprises a crystal operating at a frequency of n×44.1 kHz, where n is again 512, so that the crystal operates at a frequency of 22.5792 MHz. Subsequently, an analog signal appears on the output 57. The device further comprises a speed control for the tape transport. This speed control comprises a synchronizing-signal detector 60, a phase comparator 61, a frequency converter 62 and a control device for controlling the transport speed of a motor 63 by means of a control signal which is generated by the phase comparator 61 and is applied to the motor via a loop filter 64A, comprising an integrator. The motor 63 drives a capstan 64 which cooperates with a pressure roller 66 to provide the transport of the record carrier 22.

By means of the sync detector 60, a frequency signal related to the frame rate FR (in frames/s) of the signal being read is derived from the signal read from the record carrier. The frame rate FR can be derived from the serial output signal supplied by the reading device 40 in a manner as described with reference to FIG. 6. By means of the frequency converter 62, a frequency FR' which is in a fixed relationship to the desired frame rate is derived from the clock frequency m×48 kHz from the frequency source 51. For deriving the frequency FR', the frequency converter 62 also receives the frequency fs of n×44.1 kHz from the clock generator 54, via the line 68.

Variations of fs influence the value FR'. If fs has exactly the nominal value of 44.1 kHz, FR' will be a multiple of the nominal frame rate of 376/64. However, variations of the frequency m×fp do not result in variations of FR'. In the comparator 61, the two frequencies FR and FR' are compared with each other. From the difference, a control signal is derived for controlling the motor speed, and hence the transport speed of the record carrier, via the line 64. The operation of the device shown in FIG. 4 will be described in more detail with reference to FIG. 5.

Figure 5A:
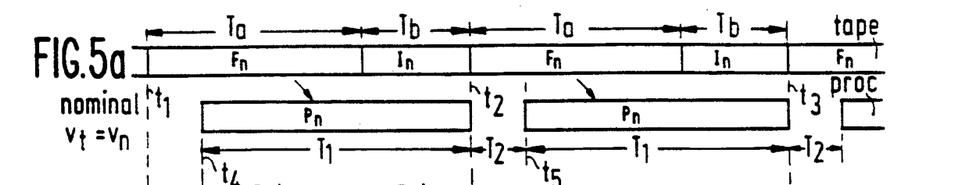
FIGS. 5a-5g illustrate the process of reading the information from the record carrier depending upon variations in the sample rate, the bit rate and the length of the interframe gap.

FIG. 5a pertains to the nominal situation. This means that the sample rate fs is exactly equal to the nominal value fsn (=44.1 kHz), the clock frequency fp is exactly equal to the nominal value fpn (=24.576 MHz), the interframe gaps on the record carrier have exactly their nominal length of 64 channel bits, and the frame rate FR is exactly equal to the nominal frame rate FRN of 375/64 frames/s. The tape transport is then effected at a sped Vt equal to the nominal transport (or read) speed Vn. FIG. 5a, therefore, in fact corresponds to FIG. 2a. The upper line represents the serial data stream of the frames alternating with the interframe gaps in the time sequence in which they are read. Since Vt=Vn, this means that this line also represents the physical position of the nominal frames Fn and the nominal interframe gaps In on the record carrier. The second line in FIG. 5a shows the nominal program cycle comprising program blocks Pn of a length T1 and intervals of a length T2.

Figure 5B:
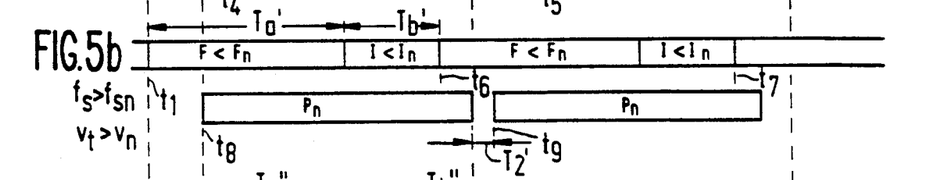

FIG. 5b represents the situation in which the sample rate fs produced by the frequency source 54 is higher than the nominal sample rate fsn, the other parameters being unchanged. Since fp has not changed the processing time in the program block P remains the same (i.e., P=Pn) and is consequently TI. The higher sample rate for the samples applied to the D/A converter 50 means that a larger data stream is applied to this D/A converter 50. This also means that a larger data stream is to be read from the record carrier 22.

A control signal is generated on the line 64 such that the transport speed Vt increases (Vt>Vn). The frames Fn thus recorded on the record carrier as illustrated in FIG. 5a are now read at a faster rate. This is represented by means of the upper line in FIG. 5b. This line indicates how the information read from the record carrier is applied to the signal processor 43, as a function of time.

As is apparent from FIG. 5b, the frames now succeed each other more rapidly (Ta'+Tb'<Ta+Tb). Similarly, the program blocks, which basically have the same length as in FIG. 5a, now succeed one another more rapidly viewed in time (T2'<T2). Consequently the program cycle is shorter. Both the frame rate and the bit rate of the signal read from the record carrier are higher than the nominal frame rate and the nominal bit rate, respectively. It is obvious that the transport speed is increased exactly as much as is necessary to allow for the increased data stream at the input of the D/A converter 50.

Figure 5C:
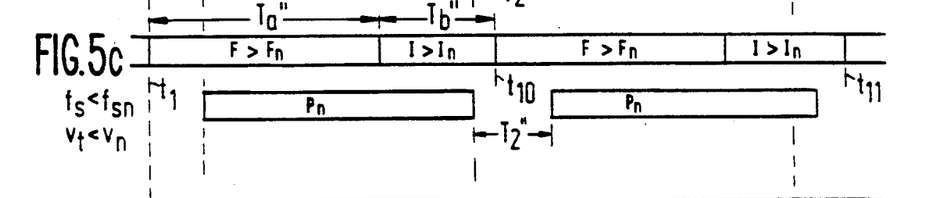

FIG. 5c illustrates the situation in which fs is smaller than the nominal sample rate fsn, the other parameters being unchanged. In the same way as in FIG. 5b, the processing time in the program blocks P remains the same, i.e., T1, fp is equal to fpn. The lower frequency at the input 49 of the D/A converter 50 means that the data stream at this input 49 is smaller than the nominal data stream at this point. This also requires a smaller data stream on the line 42. Consequently, a control signal is generated on the line 64 such that the transport speed Vt of the record carrier 22 is reduced (Vt<Vn). The frames, which have been recorded on the record carrier 22 in a manner as illustrated in FIG. 5a, are, therefore, read with a delay. This is represented by the upper line in FIG. 5c. The frames now succeed each other more slowly (T"+Tb">Ta+Tb). Similarly, the program blocks P succeed one another more slowly (T2">T2). Both the frame rate and the bit rate in the signal read from the record carrier 22 are, therefore, smaller than the nominal frame rate and the nominal bit rate, respectively. Again the reduction of the transport speed of the record carrier is exactly as much as is necessary to allow for the reduced data stream at the input 49 of the D/A converter 50.

Figure 5D:
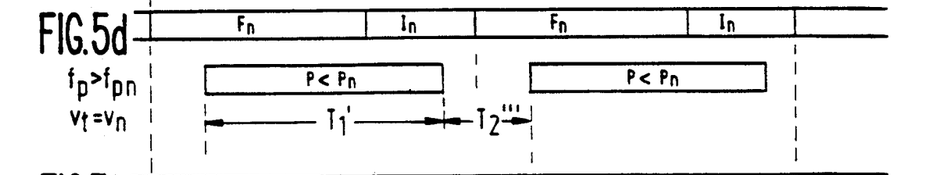

FIG. 5d illustrates a situation in which only the clock frequency fp deviates from the nominal value, i.e. fp>fpn. Since fs is equal to fsn the transport speed Vt remains equal to the nominal transport speed Vn. The information read from the record carrier, see the upper line in FIG. 5d, is the same as in the situation illustrated in FIG. 5a. Only the program blocks P are shorter (T1'<T1). However, the total program cycle does not change (T1'+T2'''=T1+T2).

Figures 5E, 5F:
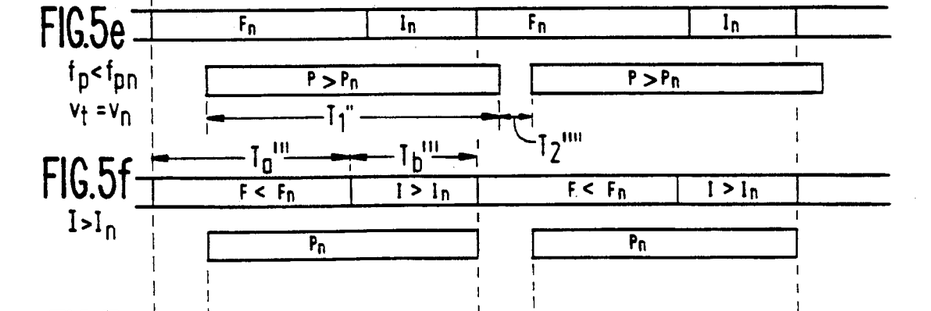

FIG. 5e illustrates the situation in which fp<fpn. In that case, the program blocks P are longer, i.e., T''>T1. Conversely, the intervals are smaller, i.e., T2''''<T2. However, the total program cycle has not changed: T1''+T2''''=T1+T2.

FIG. 5f illustrates a situation in which the interframe gaps on the record carrier are larger than the nominal interframe gaps, i.e., I>In. An interframe gap on the record carrier being larger than the nominal interframe gap can be obtained in two ways, namely in that during recording fs<fsn, see FIG. 2c, or in that during recording fp>fpn, see FIG. 2d.

Starting from the situation of FIG. 2c, in which the frames have been recorded on the record carrier in such a way that the overall length of a frame and an interframe gap on the record carrier is greater than the nominal length, the motor control in the reproducing device will be such that the read time for one frame and one interframe gap corresponds exactly to the nominal read time Ta+Tb. This means that the transport speed is increased (vt>vn). Since the frame length on the record carrier in FIG. 2c is equal to the nominal frame length, this means that during reading at a speed vt>vn the read time Ta''' for a frame is smaller than the nominal read time Ta. This means that the read time Tb''' for the interframe gaps during reading is longer than the nominal read time Tb for the interframe gap. This is illustrated in FIG. 5f.

Starting from the situation of FIG. 2d, in which the frames and interframe gaps are arranged on the record carrier in such a manner that the total length of a frame and an interframe gap is exactly equal to the nominal length Ta+Tb, this means that during reproduction the transport speed Vt of the record carrier is selected to be equal to the nominal transport speed vn.

During reading, the data stream, therefore, comprises frames of a length smaller than the nominal frame length and an interframe gap of a length greater than the nominal interframe gap length. This is exactly as illustrated in FIG. 2d. The data stream being read, as represented by the upper line in FIG. 5f, consequently also applies to the reproduction of a signal recorded in a manner as illustrated in FIG. 2d. The program blocks have a duration equal to the nominal program duration T1, because fp is equal to the nominal clock frequency fpn.

Figure 5G:
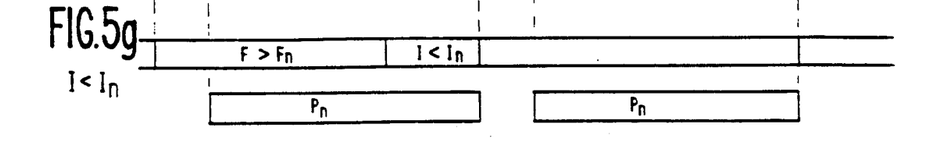

FIG. 5g represents the situation in which a record carrier is read with frames and interframe gaps such that the length of the interframe gap on the record carrier is smaller than the nominal interframe gap length. This is the situation as illustrated in FIGS. 2b and 2e.

In the situation as illustrated in FIG. 2b, where the total length of a frame and an interframe gap is smaller than the nominal length, the motor control of the reproducing device will control the motor transport in such a way that the total read time for a frame and an interframe gap becomes equal to the nominal read time Ta+Tb, see FIG. 5a. This means that the transport speed vt is smaller than the nominal transport speed vn. Since the length of the frame in FIG. 2b is equal to the nominal frame length, this means that the read time for a frame is greater than the nominal read time Ta and the read time for an interframe gap is smaller than the nominal read time Tb.

In the situation illustrated in FIG. 2e, the total length of a frame and an interframe gap on the record carrier is equal to the nominal length. During reading, the transport speed of the record carrier will, therefore, be equal to the nominal transport speed. This means that the read time for the frame is longer than the nominal read time Ta and that the read time for an interframe gap is smaller than the nominal read time Tb.

In both of these previously discussed cases, a situation as illustrated by the upper line of FIG. 5g is obtained. Since the clock frequency fp is equal to the nominal clock frequency fpn, the duration of the program blocks is equal to the nominal program duration T1.

It is evident that variations of the crystal frequency, n×44.1 kHz of the generator 54 influence the speed of information transfer between the signal processor 43 and the subband decoder unit 46, and also influence the starting instants of the signal processing in the program blocks in the signal processor 43, see FIGS. 5b and 5c. This influence is indicated diagrammatically by a broken line in FIG. 4 and will be explained with reference to FIG. 6.

Figure 6:
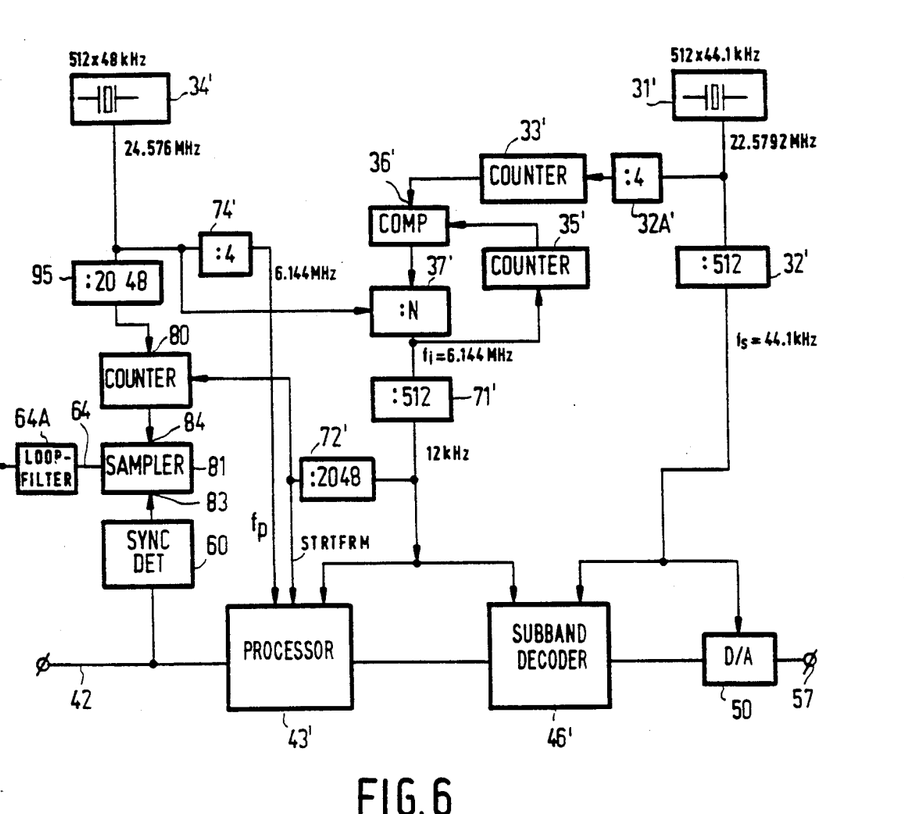
FIG. 6 shows the reproducing device of FIG. 4 in more detail.

FIG. 6 shows the reproducing device of FIG. 4 in greater detail, the operation of the device, as already illustrated by means of FIG. 5, being described in more detail. The circuit shown in FIG. 6 comprises many parts also used in the circuit shown in FIG. 3. In FIG. 6, these parts bear the same reference numerals but primed.

The operation of the parts bearing primed reference numerals is identical to the operation of the corresponding parts in FIG. 3. This means that the frequency divider 71' supplies a nominal frequency of 12 kHz, which nominal frequency is not influenced by variations of the frequency of the crystal 34' but is affected by variations of the frequency of the crystal 31'. Variations in the frequency of the crystal 31' in a positive sense (the value increases) result in a higher frequency at the output of the divider 71' and variations in a negative sense (the frequency of the crystal 31' decreases) result in a lower frequency at the output of the divider 71'. The frequency of divider 71, dictates the bit rate of the information transfer between the processor 43' and the subband decoder 46'. In the nominal situation this bit rate is again $(12,000 \times 32) = 384$ kb/s.

The device further comprises a counter 80, a sampler 81 and the sync detector 60, as also shown in FIG. 4. The counter 80 and the sampler 81 together constitute the phase comparator 61 in FIG. 4.

Figure 7A:
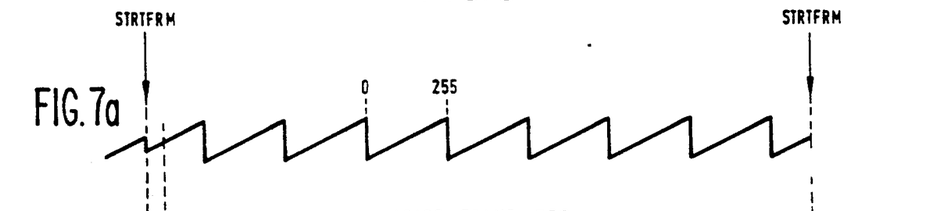
FIGS. 7a and 7b show some signal waveforms appearing in the reproducing device shown in FIG. 6.

The counter 80 is an 8-bit counter which, under the influence of the clock pulses supplied by the crystal 34', counts from 0 to 255, after which it is restarted. At the instant at which a frame starts, which instant is dictated by a clock pulse supplied by the frequency divider 72', the counter 80 is set to a specific starting value, after which this counter proceeds to count under the influence of the clock pulses from the crystal 34'. This is illustrated in FIG. 7a. FIG. 7a shows that the appearance of a pulse from the divider 72', indicated by "strtfrm", causes the counter to be set to the count "56" (decimal). The reason for this will become apparent hereinafter.

Figure 7B:
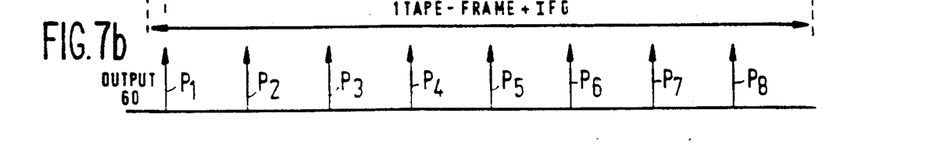

The sync detector 60 is adapted to derive the sync words from the serial information stream being read. These sync words are the block sync words in the signal. Each frame of the information signal as recorded on the record carrier comprises a plurality of frame blocks. Netherlands Patent Application no. 9001038 states that a frame in a track comprises 32 frame blocks. Each block comprises 51 10-bit words. Consequently, a frame comprises $32 \times 510 = 16,320$ bits in total. Each block comprises one block sync word. Consequently, the detector 60 detects 32 block sync words in a frame. FIG. 7b shows the output signal of the detector 60. The detector 60 generates 8 pulses per frame at the output. In fact, this means that the detector 60 detects every fourth block sync word, upon which it produces a pulse on its output.

Each time a pulse from the detector 60 appears on its input 83 the sampler 81 takes over the count of the counter 80 applied to its input 84 and generates a control signal corresponding to this count, which signal is applied, via line 64, to the motor 63 for driving the capstan 65. In the nominal situation, i.e., the frequencies of the crystals 31' and 34' and the interframe gap length on the record carrier all have their nominal value and the pulses in FIG. 7b are situated at such instants that the count is stored in the sampler 81 halfway between the counts 0 and 255 (decimal), i.e., the count 127 or 128. The control signal on line 64 is such that the motor control corrects the transport speed of the record carrier to be exactly equal to the nominal speed vn, see FIG. 5a, so that the actual frame rate FR corresponds exactly to the desired frame rate FR', see FIG. 4.

The instant at which a frame begins, which is the instant of the first STRTFRM pulse in FIG. 7a, and the initial count to which the counter 80 should then be set, should of course be such that at a clock frequency of 12 kHz, with which the counter 80 is driven after the frequency division by 2048 in the divider 95, the counter has reached the count 127 or 128 at the instant at which the first pulse appears on the output of the block sync detector 60, i.e., the first pulse P1 in FIG. 7b. The pulses STRTFRM generated by the divider 72' dictate the instants t1, t2, t3, see FIG. 5a. If the information read from the record carrier is adequate to enable the signal processing in the processor 43, to be started, which is at the instant t4, this signal processing is continued until the entire operation in a program block is completed. This is at the instant t2. At this instant, the processor 43' starts to accept information of a subsequent frame, so that processing of this information can be started at the instant t5.

It is to be noted that in the present case, the processor bears the reference numeral 43'. and the subband decoder bears the reference numeral 46'. The reason for this is that the unit 43' forms that section of the signal processor 43 which performs the signal processing upon the information stream. This means that the processor 43 in FIG. 4 comprises the section 43' and some peripheral devices, such as some of the counters and frequency dividers shown in FIG. 6. The same applies with respect to the subband decoder 46' of FIG. 6 which is a portion of the subband decoder unit 46 of FIG. 4.

For the following example, it is assumed that $fs > fsn$. This means that the crystal 31' operates at a higher frequency than 22.5792 MHz, see FIG. 5b. As a result of this, the frequency of the pulses on the output of the divider 72' increases. Therefore, the STRTFRM pulses succeed one another more rapidly. This means that the counter 80 is reset to the initial count sooner and that upon the next pulse, which is the pulse P1 in the signal shown in FIG. 7b, the count of the counter 80 is higher than 127 or 128. The sawtooth curve shown in FIG. 7a does not changed because the counter 80 is driven with a frequency derived from the crystal 34' which still operates at its nominal value. Thus, on line 64, a control signal is generated which causes the transport speed to increase until the pulses of FIG. 7b appear at instants averaged over one frame for which the counts at the instants of the pulses Pi in FIG. 7b, which are now spaced more closely in time, are 127 or 128. This means that at the instants at which the pulses P1, P2, P3, P4 appear the counts are larger than 127 or 128 and at the instants at which the pulses P5, P6, P7 and P8 appear the counts are smaller than 127 or 128. In more general terms, this means that the counts decrease each time at those instants at which the successive pulses P1 to P8 appear within two consecutive STRTFRM pulses. Since the motor control is an integrating control, see the loop filter 64A in FIG. 4, the transport speed at the increased speed vt (>vn) is maintained and the count of the counter 80 remains 127 or 128 averaged over a (plurality of) frame(s).

Consequently, the frames as well as the interframe gaps are read within a shorter time. This is illustrated by the upper line in FIG. 5b. The time interval of t1, t6 of FIG. 5b is shorter than the time interval t1, t2 of FIG. 5a. Since the processor 43' is operated at a nominal frequency of 6.144 MHz, the signal processing performed in a program block takes the same time as in the nominal situation.

For this example, it is assumed that fs < fsn, see FIG. 5c. This means that the crystal 31' operates at a frequency below 22.5792 MHz. The frequency divider 72' now supplies the STRTFRM pulses at a frequency lower than the nominal frequency of 375/64. This means that viewed in time the counter 80 is reset to the initial count at a later instant and that upon the next pulse, which is the pulse P1, in the signal shown in FIG. 7b the count of the counter 80 is smaller than 127 or 128. A control signal is generated on line 64, which signal ensures that the transport speed is reduced until the pulses shown in FIG. 7b, which are now spaced further apart viewed in time, appear at instants in a frame for which the counts average 127 or 128. This means that at the instants at which the pulses p1, p2, p3 and p4 appear the counts are smaller than 127 or 128, while at the instants at which the pulses p5, p6, p7 and p8, appear the counts are larger than 127 or 128. This is because viewed in time the sawtooth curve shown in FIG. 7a has not changed since the crystal 34' operates at its nominal frequency. In more general terms, this means that the counts each time increase at those instants of the successive pulses p1 to p8 which appear within two consecutive STRTFRM pulses. Since the motor control is an integrating control, the transport speed is maintained at the reduced speed vt (<vn) and, averaged over a (plurality of) frame(s), the count is 127 or 128 at the sampling instants represented by the instants at which the pulses from the sync detector 60 appear.

Thus, the frames as well as the interframe gaps are read from the record carrier over a longer time. This is illustrated by the upper line in FIG. 5c. The time interval t1, t10 of FIG. 5c is longer than the time interval t1, t2 of FIG. 5a. Since the processor 43' is operated at the nominal frequency fpn of 6.144 MHz, the signal processing performed in a program block P takes as much time as in the nominal situation.

For this example, it is assumed that fp > fpn, see FIG. 5d. This means that the spacing between the STRTFRM pulses has not changed. This is because variations of fp do not influence the frequency supplied by the dividers 71' and 72'. On account of the higher clock frequency applied to the counter 80, the sawtooth shown in FIG. 7a, viewed in time, has a higher frequency. Averaged over one frame, the counts at the instants at which the pulses p1 to p8 appear, will again be 127 or 128. This means that the counts at the instants at which the pulses p1, p2, p3 and p4 appear are smaller than 127 or 128 and the counts at the instants after the pulses p5, p6, p7 or p8 are larger than 127. In more general terms, this means that the counts each time increase at those instants at which the successive pulses P1 to P8 appear within two consecutive STRTFRM pulses. Averaged over a (plurality of) frame(s) the count of the counter 80 remains 127 or 128. The transport speed of the record carrier then remains equal to the nominal transport speed vn.

A similar line of reasoning applies to the situation for which fp < fpn, see FIG. 5e. Viewed in time, the sawtooth shown in FIG. 7a has now slowed down. This means that the counts at the instants at which the pulses p1, p2, p3 and p4 appear are larger than 127 or 128 and the counts at the instants at which the pulses p5, p6, p7 and p8 appear are smaller than 127 or 128. In more general terms, the counts each time decrease at those instants at which the successive pulses P1 to P8 appear within two consecutive STRTFRM pulses. However, averaged over a (plurality of) frame(s) the counts are still 127 or 128 at a transport speed equal to the nominal transport speed Vn.

In FIG. 5f, the interframe gap on the record carrier is larger than the nominal interframe gap. In the situation illustrated in FIG. 2c, the frames, including the interframe gap on the record carrier, appear to be longer than the nominal length. Since the sawtooth shown in FIG. 7a has not changed and the STRTFRM frequency has not changed, the average count of the counter 80 in the case of a nominal transport speed during reading would be too high for one frame period (higher than 127 or 128). The transport speed is then increased so that averaged over a (plurality of) frame(s) the count is again 127 or 128. However, in a situation as illustrated in FIG. 2d the counts during reading at the nominal transport speed are already 127 or 128 averaged over a (plurality of) frame(s). Thus, the nominal transport speed is maintained. Starting from both situations, this means that a signal is read as illustrated in FIG. 5f by the upper line.

In FIG. 5g, the interframe gap length on the record carrier was smaller than the nominal interframe gap length. If this relates to a situation such as the one illustrated in FIG. 2b, the frames, including the interframe gaps, on the record carrier appear to be shorter than the nominal length. Since the sawtooth shown in FIG. 7a has not changed and the STRTFRM frequency has also remained the same, the average count of the counter 80 at a nominal transport speed during reading would be too low for a (plurality of) frame(s). Therefore, the transport speed decreases so that the average count again becomes 127 or 128. However, in the situation of FIG. 2e, the counts during reading at the nominal transport speed are already equal to 127 or 128 averaged over one frame period. Consequently, the nominal transport speed is maintained.

It is to be noted that the invention is not limited to the embodiments disclosed herein. Various modifications of the embodiments described are possible without departing from the scope of the invention as defined in the appended claims.

I claim:
1. A recording and reproducing system, comprising:
   recording means for recording a digital signal on a record carrier, said recording means
      (a) having an input for receiving the digital signal at a sampling rate; and
      (b) being adapted to (i) convert the digital signal into a modified signal which is accommodated in consecutive frames, the modified signal having a bit rate, and (ii) record the frames alternating with interframe gaps in a track on the record carrier; and
   reproducing means for reproducing the digital signal recorded on the record carrier, said reproducing means
      (a) having an output; and
      (b) being adapted to (i) red the frames alternating with interframe gaps recorded in the track to obtain a reproduction of the modified signal, (ii) reconvert the reproduced modified signal into the reproduced digital signal, and (iii) supply the reproduced digital signal to said output at substantially the sample rate;
wherein the interframe gaps in the track have lengths which vary in relation to variation in at least one of the sample rate and the bit rate.

2. The digital recording and reproducing system as claimed in claim 1, wherein the frames a recorded in the track have a lengths which can vary in relation to variation in the bit rate.

3. The digital recording and reproducing system as claimed in claim 1, wherein each of the interframe gaps comprises channel bits with logic values which alternate one after the other.

4. The digital recording and reproducing system as claimed in claim 1, wherein each of the interframe gaps has a nominal length of 64 channel bits.

5. The digital recording and reproducing system as claimed in claim 1, wherein the interframe gaps have lengths which vary between 32 and 96 channel bits.

6. The digital recording and reproducing system as claimed in claim 1, wherein the digital signal, after conversion and accommodation in the frames, is recorded in a plurality of longitudinally juxtaposed tracks on the record carrier; the frames alternating with interframe gaps being recorded in the tracks such that the interframe gaps of adjacent tracks are situated at substantially the same position, viewed in the longitudinal direction of the record carrier, and adjacent interframe gaps have the same lengths.

7. The digital recording and reproducing system as claimed in claim 2, wherein each of the interframe gaps ha a nominal length of 64 channel bits.

8. The recording and reproducing system as claimed in claim 1, wherein the ample rate has a nominal rate and varies form the nominal rate up to a maximum variation of about 0.2%, and each of the interframe gaps has a nominal length of 64 channel bits and as a result of the maximum variation varies from its nominal length up to a maximum length of about by 32 channel bits.

9. A recording device for recording a digital signal on a record carrier, the recording device comprising:
conversion means
(a) having a conversion means input for receiving the digital signal at a sampling rate, a conversion means clock signal input, and a conversion means output; and
(b) being adapted to (i) convert the digital signal into a modified signal which is accommodated in consecutive frames, the modified signal having a bit rate, and (ii) supply the frames alternating with interframe gaps to said conversion means output;
write means coupled to said conversion means output for recording the frames alternating with interframe gaps in a track on the record carrier; and
source means for supplying a clock signal with a clock frequency to said conversion means clock signal input, the clock frequency having a fixed relationship with the bit rate;
wherein the interframe gaps recorded in the track have lengths which vary in relation to variation in at least one of the sample rate and the clock frequency.

10. A record carrier produced by the recording device as claimed in claim 9 having frames alternating with interframe gaps in a longitudinal track on the record carrier, the interframe gaps having lengths which vary.

11. The record carrier as claimed in claim 10, wherein the frames recorded in the track on the record carrier have lengths which vary.

12. The recording device as claimed in claim 9, wherein the frames have lengths which vary in relation to variation of the clock frequency.

13. The recording device as claimed in claim 9, further comprising tape-transparent means for providing transport of the record carrier, wherein said tape-transparent means operates independently of variation in at least one of the sample rate and the clock frequency.

14. The recording device as claimed in claim 9, wherein aid conversion means comprises
interframe gap signal generator means having an interframe gap signal generator output, and being adapted to generate an interframe gap signal at the interframe gap signal generator output;
signal processing means
(a) having a signal processing output and a control signal output, and
(b) being adapted to generate (i) the modified signal and supply the frames to said signal processing output, and (ii) a control signal at said control signal output at time intervals in which no frames are supplied to said signal processing output; and
controllable switching means
(a) having a controllable switching means output coupled to said conversion means output, a control signal input coupled to said control signal output, and a first and a second input, said signal processing output and said interframe gap signal generator output being coupled to said first and said second inputs, respectively; and
(b) being adapted to couple said second input to said conversion means output when the control signal is generated at said control signal output, and to couple said first input to said conversion means output in the absence of the control signal at said control signal output.

15. The recording device as claimed in claim 9, wherein each of the interframe gaps comprises channel bits with logic values which alternate one after the other.

16. The recording device as claimed in claim 9, wherein each of the interframe gaps ha a nominal length of 64 channel bits.

17. The recording device as claimed in claim 9, wherein the interframe gaps have lengths which vary between 32 and 96 channel bits.

18. The recording device as claimed in claim 9, wherein the sample rate has a nominal rate and varies from the nominal rate up to a maximum variation of about 0.2%, and each of the interframe gaps has a nominal length of 64 channel bits and as a result of the maximum variation varies from tis nominal length up to a maximum length of about 32 channel bits.

19. The recording device as claimed in claim 9, wherein said write means is adapted to record the frames alternating with interframe gaps in a plurality of longitudinally juxtaposed tracks on the record carrier, the frames alternating with interframe gaps being recorded in the tracks such that the interframe gaps of adjacent tracks are situated at substantially the same position, viewed in the longitudinal direction of the record carrier, and adjacent interframe gaps have the same lengths.

20. The recording device as claimed in claim 9, wherein the recording device is further adapted to decrease the lengths of the interframe gaps when the sampling rate increases.

21. The recording device as claimed in claim 9, wherein the recording device is further adapted to increase the lengths of the interframe gaps when the sampling rate decreases.

22. The recording device as claimed in claim 9, wherein the recording device is further adapted to increase the lengths of the interframe gaps when the clock frequency increases.

23. The recording device as claimed in claim 9, wherein the recording device is further adapted to decrease the lengths of the interframe gaps when the clock frequency decreases.

24. A reproducing device for reproducing a digital signal recorded as a modified signal accommodated in frames on a record carrier, the frames having been recorded alternating with interframe gaps in a track on the record carrier, the reproducing device comprising:
   read means for reading the frames having been recorded alternating with interframe gaps in the track to obtain a reproduction of the modified signal, said read means having a read output;
   reconversion means for reconverting the reproduced modified signal into the reproduced digital signal, said reconversion means having a reconversion input coupled to said read output, a reconversion mans clock signal input and a reconversion output for supplying the reproduced digital signal at an output rate substantially equal to the sample rate at which the digital signal was supplied during recording;
   source means for supplying a clock signal with a clock frequency to said reconversion means clock signal input, the clock frequency having a fixed relationship with the output rate, said source means having a clock signal output; and
   compensation means for compensating for variation in at least one of length of a frame and a succeeding interframe gap in the track and the clock frequency, said compensation means being coupled to said reconversion means.

25. The reproducing device as claimed in claim 24, wherein said compensation means comprises:
   a synchronizing-signal detector having a synchronizing-signal detector input coupled to said read output, and a synchronizing-signal detector output;
   a frequency converter having a frequency converter input which is coupled to said clock signal output, and a frequency converter output;
   a phase comparator being adapted to generate a control signal, said phase comparator having a first input coupled to said synchronizing-signal detector output, a second input coupled to said frequency converter output and a phase comparator output; and
   a tape-transport mans for controlling the transport speed of the record carrie in accordance with the control signal, said tape-transport means having a control input coupled to said phase comparator output for receiving the control signal.

26. The reproducing device as claimed in claim 25, wherein said phase comparator is further adapted to compare a first signal, supplied by said synchronizing-signal detector, which first signal is related to a fame rate for the frames read from the record carrier, with a second signal, supplied by said frequency converter, which second signal is related to a desired frame rate; and said tape-transport means is adapted to control the transport speed of the record carrier so that the frame rate for the frames read from the record carrier is substantially equal to the desired frame rate.

27. The reproducing device as claimed in claim 25, wherein said tape-transport means is adapted to increase the transport speed of the record carrier when the clock frequency increases.

28. The reproducing device as claimed in claim 25, wherein said tape-transport means is adapted to decrease the transport speed of the record carrier when the clock frequency decreases.

29. The reproducing device as claimed in claim 25, wherein said tape-transport means is adapted to increase the transport speed of the record carrier when the length of a frame and its succeeding interframe gap increases.

30. The reproducing device as claimed in claim 25, wherein said tape-transport means is adapted to decrease the transport speed of the record carrier when the length of a frame and its succeeding interframe gap decreases.

31. The reproducing device as claimed in claim 24, wherein the frames are in a plurality of longitudinally juxtaposed tracks on the record carrier, each track having frames which alternate with interframe gaps, interframe gaps of adjacent tracks being situated at substantially the same position, viewed in the longitudinal direction of the record carrier, and adjacent interframe gaps having the same lengths; and wherein said read means is adapted for reading the frames alternating with interframe gaps recorded in the plurality of longitudinally juxtaposed tracks.

* * * * *

UNITED STATES PATENT AND TRADEMARK OFFICE
CERTIFICATE OF CORRECTION

PATENT NO. : 5,267,098
DATED : November 30, 1993
INVENTOR(S) : Geraruds C. P. Lokhoff It is certified that error appears in the above-indentified patent and that said Letters Patent is hereby corrected as shown below:

IN THE CLAIMS
```
Claim  1, column 20, line 64, change "red" to --read--.
Claim  2, column 21, line  7, delete "a";
                     line  8, delete "a" and "can".
Claim  7, column 21, line 32, change "ha" to --has--.
Claim  8, column 21, line 34, change "ample" to --sample--;
                     line 39, delete "by".
Claim 14, column 22, line 13, change "aid" to --said--.
Claim 16, column 22, line 45, change "ha" to --has--.
Claim 24, column 23, line 29, change "mans" to --means--.
Claim 25, column 24, line  7, change "mans" to --means--;
                     line  8, change "carrie" to --carrier--.
Claim 26, column 24, line 15, change "fame" to --frame--.
```

Signed and Sealed this

Fourteenth Day of June, 1994

Attest:

BRUCE LEHMAN

Attesting Officer

Commissioner of Patents and Trademarks